United States Patent
Zeng

(10) Patent No.: US 11,544,633 B2
(45) Date of Patent: Jan. 3, 2023

(54) METHOD FOR CLEANING UP BACKGROUND APPLICATION, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 446 days.

(21) Appl. No.: 16/819,777

(22) Filed: Mar. 16, 2020

(65) Prior Publication Data
US 2020/0219016 A1    Jul. 9, 2020

Related U.S. Application Data

(63) Continuation of application No. PCT/CN2018/099364, filed on Aug. 8, 2018.

(30) Foreign Application Priority Data

Sep. 30, 2017 (CN) .......................... 201710922744.2

(51) Int. Cl.
    *G06N 20/20* (2019.01)
    *G06F 9/445* (2018.01)
    (Continued)

(52) U.S. Cl.
    CPC ......... *G06N 20/20* (2019.01); *G06F 9/44594* (2013.01); *G06N 5/003* (2013.01); *G06N 5/04* (2013.01)

(58) Field of Classification Search
    None
    See application file for complete search history.

(56) References Cited

U.S. PATENT DOCUMENTS

| | | |
|---|---|---|
| 2004/0073764 A1 | 4/2004 | Andreasson |
| 2012/0290530 A1 | 11/2012 | Saner |
| (Continued) | | |

FOREIGN PATENT DOCUMENTS

| | | |
|---|---|---|
| CN | 104866366 A | 8/2015 |
| CN | 105335099 A | 2/2016 |
| (Continued) | | |

OTHER PUBLICATIONS

J. R. Quinlan, "Induction of Decision Trees", 1986. (pp. 81-106).
(Continued)

*Primary Examiner* — Insun Kang
(74) *Attorney, Agent, or Firm* — Young Basile Hanlon & MacFarlane, P.C.

(57) ABSTRACT

A method for cleaning up a background application, a storage medium, and an electronic device are provided. The method includes the following. Collect multi-dimensional feature information associated with an application as samples to construct a sample set associated with the application. Extract feature information from the sample set to construct multiple training sets. Train each training set to generate a corresponding decision tree. Predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. Determine whether the application is able to be cleaned up according to the multiple predicted results. Clean up the application when the application can be cleaned up.

20 Claims, 7 Drawing Sheets

(51) Int. Cl.
*G06N 5/00* (2006.01)
*G06N 5/04* (2006.01)

(56) References Cited

U.S. PATENT DOCUMENTS

| | | | |
|---|---|---|---|
| 2016/0019092 A1* | 1/2016 | Yuan | G06F 9/44594 718/107 |
| 2016/0217198 A1 | 7/2016 | Lee et al. | |
| 2019/0095250 A1* | 3/2019 | Qiang | G06F 9/5005 |

FOREIGN PATENT DOCUMENTS

| | | |
|---|---|---|
| CN | 105389193 A | 3/2016 |
| CN | 105608476 A | 5/2016 |
| CN | 106648023 A | 5/2017 |
| CN | 107133094 A | 9/2017 |
| CN | 107894827 A | 4/2018 |
| WO | WO-2018152734 A1 * | 8/2018 ............. G06F 9/445 |

OTHER PUBLICATIONS

Johannes Gehrke et al, "BOAT—Optimistic Decision Tree Construction", Department of Computer Sciences and Department of Statistics, University of Wisconsin-Madison, 1999. (pp. 169-180).
Extended European Search Report for EP Application 18862386.2 dated Jan. 29, 2021. (10 pages).
China First Office Action with English Translation for CN Application 201710922744.2 dated Apr. 18, 2019. (16 pages).
China Second Office Action with English Translation for CN Application 201710922744.2 dated Sep. 17, 2019. (12 pages).
International search report issued in corresponding international application No. PCT/CN2018/099364 dated Nov. 9, 2018.
Indian Examination Report for IN Application 202017012408 dated Aug. 4, 2021. (7 pages).

* cited by examiner

METHOD FOR CLEANING UP BACKGROUND APPLICATION, STORAGE MEDIUM, AND ELECTRONIC DEVICE

CROSS-REFERENCE TO RELATED APPLICATION(S)

This application is a continuation of International Patent Application No. PCT/CN2018/099364, filed on Aug. 8, 2018, which claims priority to Chinese Application Patent Serial No. 201710922744.2, filed on Sep. 30, 2017, the entire disclosure of both of which are hereby incorporated by reference.

TECHNICAL FIELD

This disclosure relates to the technical field of communications, and more particularly to a method for cleaning up a background application, a storage medium, and an electronic device.

BACKGROUND

At present, multiple applications with different functions are usually installed in electronic devices such as smart phones to meet various users' needs. Currently, the system of an electronic device supports simultaneous running of multiple applications, that is, when one application runs in the foreground, other applications can run in the background. If one or more applications running in the background are not cleaned up for a long time, available memory of the electronic device may be reduced, and central processing unit (CPU) occupancy is relatively high, resulting in that the electronic device runs slowly, a lag appears, power consumption is speeded up, and so on. Therefore, it is necessary to provide a method to solve the above problems.

SUMMARY

Implementations of the present disclosure provide a method for cleaning up a background application, a storage medium, and an electronic device.

In a first aspect of the implementations of the present disclosure, the method for cleaning up a background application in an electronic device is provided. The method includes the following. Collect multi-dimensional feature information associated with an application as samples and construct a sample set associated with the application according to the samples. Extract, according to a predetermined rule, feature information from the sample set to construct multiple training sets. Train each training set to generate a corresponding decision tree. Predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. Determine whether the application is able to be cleaned up according to the multiple predicted results. Clean up the application upon determining that the application is able to be cleaned up.

In a second aspect of the implementations of the present disclosure, an electronic device is provided. The electronic device includes at least one processor and a computer readable memory coupled to the at least one processor and storing at least one computer executable instruction thereon which, when executed by the at least one processor, is operable with the at least one processor to perform the method for cleaning up a background application described in the first aspect of the implementations of the present disclosure.

In a third aspect of the implementations of the present disclosure, a non-transitory computer readable storage medium is provided. The storage medium is configured to store computer programs which, when executed by a processor of an electronic device, cause the processor to perform the following. Collect multi-dimensional feature information associated with an application in the electronic device as samples and construct a sample set associated with the application according to the samples. Predict, with multiple decision trees related to the sample set, current feature information associated with the application and output multiple predicted results upon detecting that the application is switched to the background, where the predicted results include predicted results indicative of that the application is able to be cleaned up and predicted results indicative of that the application is unable to be cleaned up. Determine whether the application is able to be cleaned up according to the predicted results. Clean up the application upon determining that the application is able to be cleaned up.

BRIEF DESCRIPTION OF DRAWINGS

In order to describe technical solutions of implementations of the present disclosure more clearly, the following will give a brief description of accompanying drawings used for describing the implementations. Apparently, the accompanying drawings described below are merely some implementations of the present disclosure. Those of ordinary skill in the art can also obtain other accompanying drawings based on the accompanying drawings described below without creative efforts.

DETAILED DESCRIPTION

Figure 1:
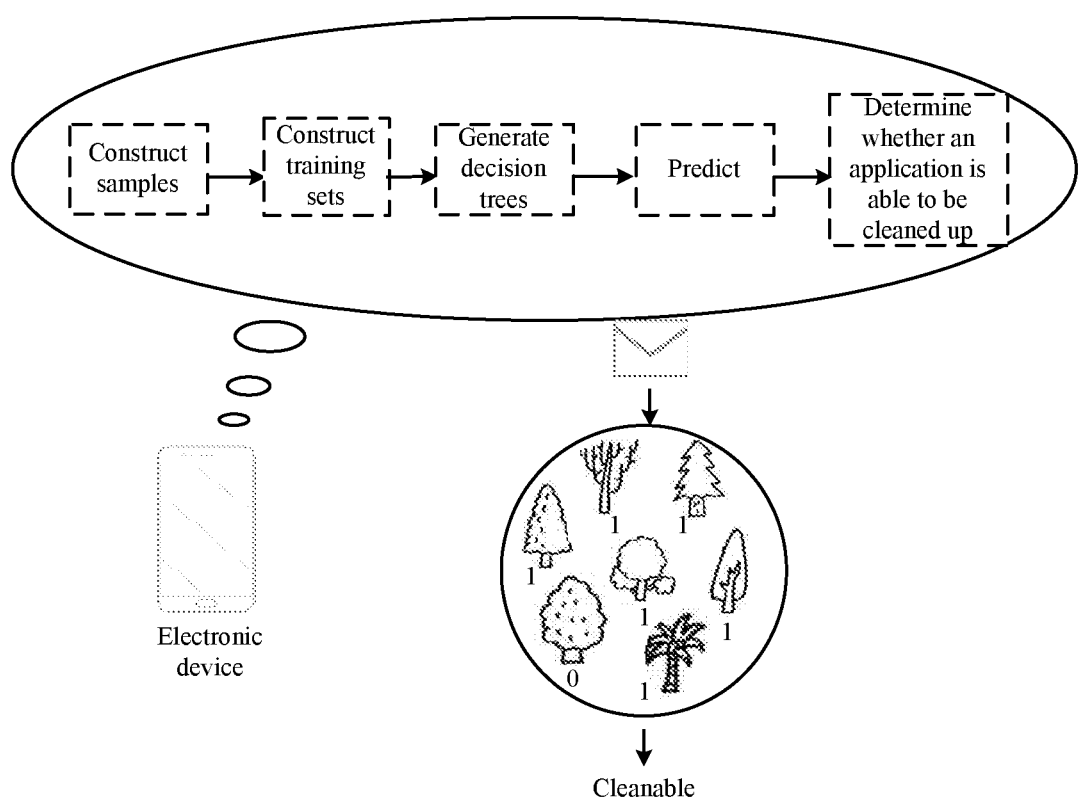
FIG. 1 is a schematic diagram illustrating an application scenario of a method for cleaning up a background application according to an implementation of the present disclosure.

Referring to the drawings, same component symbols represent same components. The principle of the present disclosure is illustrated via an implementation in an appropriate computing environment. The following description is based on illustrated specific implementations of the present disclosure, which should not be considered as a limitation on other specific implementations not detailed herein.

In the following description, specific implementations of the present disclosure will be described with reference to steps and symbols performed by one or more computers unless otherwise stated. Therefore, in these steps and operations, execution by a computer is mentioned several times. The execution by the computer referred to herein includes operations of a computer processing unit performed on electronic signals of data in a structured form. The operations convert the data or maintain the data at a location of a memory system of the computer, the operations can be reconfigured, or running of the computer can be altered in a manner well known to testers in the art. The data structure maintained by the data is a physical location of the memory, which has specific characteristics defined by the data format. However, the principle of the present disclosure is described by the above text, which does not represent a limitation. The testers in the field will understand that various steps and operations described below can also be implemented in hardware.

The term "module", as used herein, can be viewed as software objects running on the computing system. Different components, different modules, different engines, and different services described herein can be considered as implementation objects of the computing system. The devices and methods described herein can be implemented in software manner, and certainly can also be implemented in hardware, which are all within the protection scope of the present disclosure.

The terms "first", "second", "third", and the like used in the present disclosure are used to distinguish different objects rather than describe a particular order. In addition, the terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the present disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

If one or more background applications are not cleaned up for a long time, multiple problems may appear, for example, the electronic device may run slowly, a lag may appear, power consumption may be speeded up. Thus, an implementation of the present disclosure provides a method for cleaning up a background application in an electronic device. The method includes the following.

Collect multi-dimensional feature information associated with an application in the electronic device as samples and construct a sample set associated with the application according to the samples. Extract, according to a predetermined rule, feature information from the sample set to construct multiple training sets. Train each training set to generate a corresponding decision tree. Predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. Determine whether the application is able to be cleaned up according to the multiple predicted results. Clean up the application upon determining that the application is able to be cleaned up.

In an implementation, each training set is trained to generate a corresponding decision tree as follows. Compute an information gain of each piece of feature information contained in each training set. Generate a corresponding decision tree by determining a piece of feature information with a maximum information gain as a piece of feature information of a root node and determining remaining pieces of feature information as pieces of feature information of leaf nodes in descending order of information gains of the remaining pieces of feature information.

In an implementation, the information gain of each piece of feature information contained in each training set is computed as follows. Compute, with an equation $g(S, K)=H(S)-H(S|K)$, the information gain of each piece of feature information contained in each training set, where $g(S, K)$ represents an information gain of feature information K contained in a training set S, $H(S)$ represents entropy of the training set S, and $H(S|K)$ represents entropy of the training set S after dividing the training set S with the feature information K, where $H(S)=-\Sigma_{i=1}^{n} P_i \cdot \log P_i$, $P_i$ represents a probability that a predicted result of $i^{th}$ category appears in the training set S, and n represents predicted result categories, and where $H(S|K)=\Sigma_{i=1}^{n} P_i \cdot H(Y|K=K_i)$, and $H(Y|K=K_i)$ represents conditional entropy of the training set S when the feature information K is fixed to be $K_i$.

In an implementation, according to the predetermined rule, the feature information from the sample set is extracted to construct the training sets as follows. Obtain preset number pieces of feature information each time by performing a random extraction with replacement on the multi-dimensional feature information contained in each of the samples to construct a corresponding sub-sample, where each training set is constructed with multiple sub-samples, and the multiple training sets are constructed after performing the random extraction with replacement a number of times.

In an implementation, the multi-dimensional feature information associated with the application includes Q pieces of feature information, and the preset number is q. The method further includes the following. Determine, with an equation $$M = \frac{C_Q^q}{2},$$

the number of the multiple training sets constructed, where M represents the number of the multiple training sets.

In an implementation, after collecting the multi-dimensional feature information associated with the application as the samples, the method further includes the following. Mark each of the samples in the sample set with a sample tag to obtain multiple sample tags, where the sample tags comprise sample tags indicative of that the application is able to be cleaned up and sample tags indicative of that the application is unable to be cleaned up. After constructing a corresponding sub-sampling, the method further includes the following. Mark each sub-sample with a sample tag of a corresponding sample.

In an implementation, according to the multiple predicted results, whether the application is able to be cleaned up is determined as follows. Determine a ratio of the number of the predicted results indicative of that the application is able to be cleaned up to the number of all the predicted results as a cleanable probability. Determine a ratio of the predicted results indicative of that the application is unable to be cleaned up to the number of all the predicted results as a maintaining probability. Determine that the application is able to be cleaned up upon determining that the cleanable probability of the application is larger than the maintaining probability of the application, and determine that the application is kept to be in the background upon determining that the maintaining probability of the application is larger than the cleanable probability of the application.

In an implementation, when multiple applications are in the background, the method further includes the following. Select preset number applications from the multiple applications in descending order of cleanable probabilities of the multiple applications, or select, from the multiple applications, applications each with a cleanable probability larger than a preset probability. Clean up the applications selected.

In an implementation, collecting the multi-dimensional feature information associated with the application as the samples and constructing the sample set associated with the application according to the samples include the following. Collect the multi-dimensional feature information associated with the application once every preset time interval, where the multi-dimensional feature information associated with the application comprises feature information associated with running of the application and/or status feature information of an electronic device, determine the multi-dimensional feature information associated with the application collected each time as one sample, and obtain the multiple samples within a preset historical time period to construct the sample set.

In an implementation, after collecting the multi-dimensional feature information associated with the application as the samples and constructing the sample set associated with the application according to the samples, the method further includes the following. Transmit the sample set associated with the application to a server, and receive the multiple decision trees from the server.

For a method for cleaning up a background application provided in an implementation of the present disclosure, an execution body may be a device for cleaning up a background application provided in the implementation of the present disclosure, or an electronic device integrated with the device for cleaning up a background application. The device for cleaning up a background application may be implemented in a hardware or software manner. The electronic device may be a smart phone, a tablet computer, a handheld computer, a laptop computer, a desk computer, or the like.

FIG. 1 is a schematic diagram illustrating an application scenario of a method for cleaning up a background application according to an implementation of the present disclosure. As an example, a device for cleaning up a background application is taken as an electronic device. The electronic device can collect multi-dimensional feature information associated with the application as samples and construct a sample set associated with the application according to the samples, extract, according to a predetermined rule, feature information from the sample set to construct multiple training sets, train each of the training sets to generate a corresponding decision tree, predict, with multiple decision trees generated, current feature information associated with the application and output multiple predicted results when the application is switched to the background, determine whether the application is able to be cleaned up according to the multiple predicted results, and clean up the application upon determining that the application is able to be cleaned up, where the predicted results include predicted results indicative of that the application is able to be cleaned up and predicted results indicative of that the application is unable to be cleaned up.

In an implementation, for example, as illustrated in FIG. 1, determining whether a mailbox application running in the background can be cleaned up is taken as an example. Multi-dimensional feature information associated with the mailbox application during a historical time period, for example, duration that the mailbox application is in the background every day, the number of times the mailbox application is switched to the foreground every day, can be collected in a preset frequency as samples. A sample set associated with the mailbox application is constructed according to the samples, feature information in the sample set is extracted to construct multiple training sets, and each training set is trained to generate a corresponding decision tree. For example, as illustrated in FIG. 1, seven decision trees are generated. Each decision tree is used to predict current feature information associated with the mailbox application, and seven predicted results are output, where "1" represents the predicted result indicative of that the application is able to be cleaned up and "0" represents the predicted result indicative of that the application is unable to be cleaned up. In the example illustrated in FIG. 1, the predicted results indicative of that the application is able to be cleaned up are the majority, and thus it is determined that the mailbox application running in the background can be cleaned up.

The implementation of the present disclosure will describe the method for cleaning up a background application from the perspective of a device for cleaning up a background application. The device for cleaning up a background application may be integrated in an electronic device. The method for cleaning up a background application includes the following. Collect multi-dimensional feature information associated with the application as samples and construct a sample set associated with the application according to the samples, extract, according to a predetermined rule, feature information from the sample set to construct multiple training sets, train each of the training sets to generate a corresponding decision tree, and predict, with multiple decision trees generated, current feature information associated with the application and output multiple predicted results when the application is switched to the background, determine whether the application is able to be cleaned up according to the multiple predicted results, and clean up the application upon determining that the application is able to be cleaned up, where the predicted results include predicted results indicative of that the application is able to be cleaned up and predicted results indicative of that the application is unable to be cleaned up.

Figure 2:
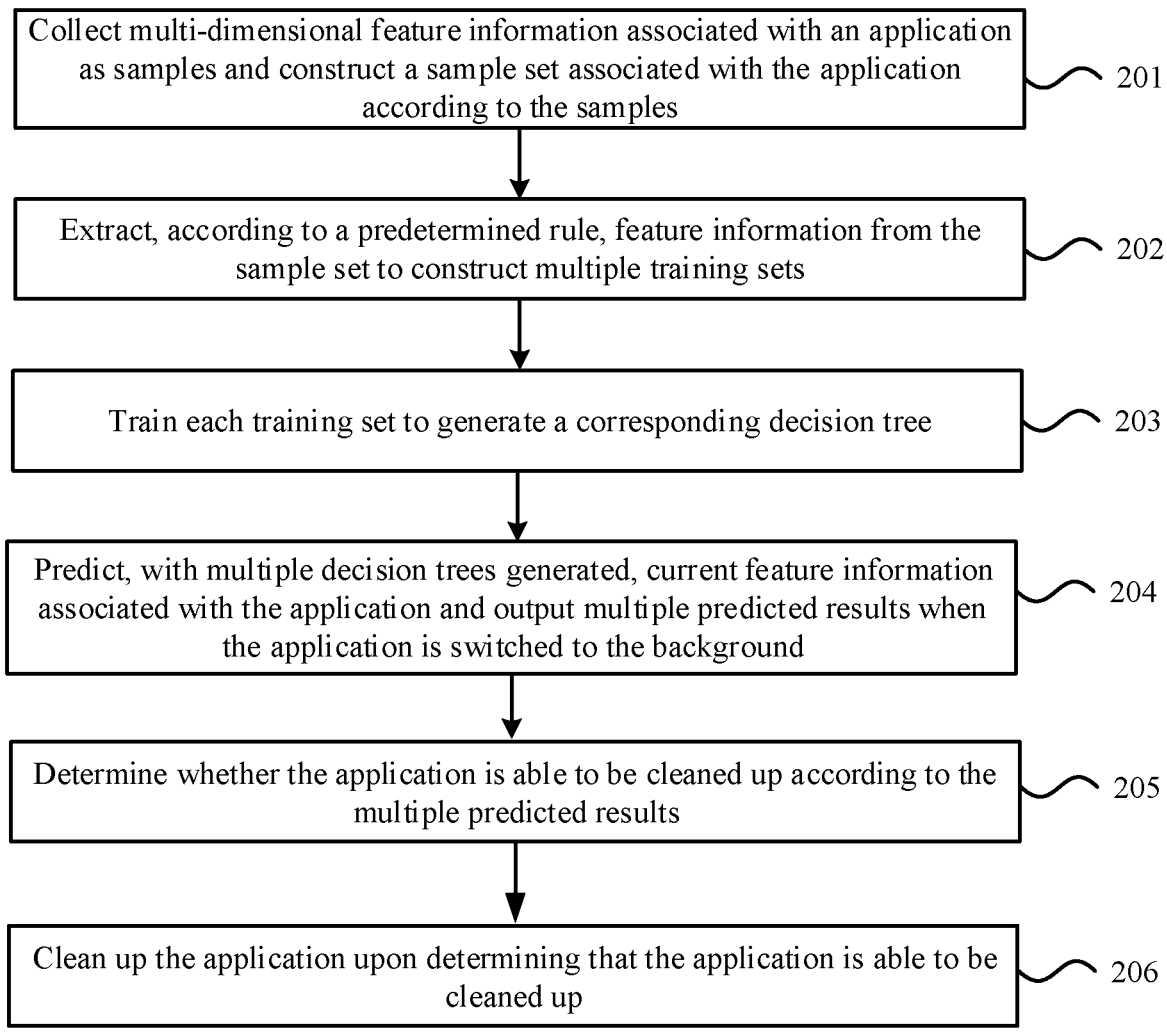
FIG. 2 is a schematic flow chart illustrating a method for cleaning up a background application according to an implementation of the present disclosure.

In an implementation, a method for cleaning up a background application is provided. As illustrated in FIG. 2, the method for cleaning up a background application includes the following.

At block 201, multi-dimensional feature information associated with an application is collected as samples and a sample set associated with the application is constructed according to the samples.

The application referred to in the implementation may be any application in an electronic device, such as an office application, a communication application, a game application, a shopping application, or the like.

The multi-dimensional feature information associated with the application has dimensions of a certain length, and parameters in each dimension correspond to a type of feature information representing the application, that is, the multi-dimensional feature information is consisted of multiple pieces of feature information. The multiple pieces of feature information may include feature information related to the application itself, that is, feature information associated with running of the application, for example, duration that the application is in the background, duration of screen-off of the electronic device during the process that the application is in the background, the number of times the application is switched to the foreground, duration that the application is in the foreground, a manner in which the application is switched to the background, such as being switched to the background in response to an operation on a home button, being switched to the background in response to an operation on a back button, being switched to the background via other applications, etc., and the type of the application, such as a first level (a common application), a second level (other application), etc. The multiple pieces of feature information may also include feature information of the electronic device having the application, that is, status feature information of the electronic device, such as duration of screen-off of the electronic device, duration of screen-on of the electronic device, current remaining battery capacity of the electronic device, wireless network connection status of the electronic device, feature information indicating whether the electronic device is in charging status or not.

The sample set associated with the application may include multiple samples collected according to a preset frequency within a historical time period. The historical time period may be, for example, the past seven or ten days. The preset frequency may be, for example, collecting every ten minutes or collecting every half an hour. It can be understood that the multi-dimensional feature data associated with the application collected each time is used to construct one sample, and the multiple samples are used to construct the sample set.

After the sample set is constructed, each sample in the sample set can be marked with a sample tag to obtain multiple sample tags. Since in the implementation what needs to be achieved is to predict whether the application can be cleaned up, the sample tags include sample tags indicative of that the application is able to be cleaned up and sample tags indicative of that the application is unable to be cleaned up. In an implementation, marking can be performed according to historical usage habits associated with the application. For example, if the application is closed at a time point duration that the application is in the background reaches or exceeds 30 minutes, the application is marked as the application that is able to be cleaned up. For another example, if the application is switched to the foreground at a time point duration that the application is in the background reaches or exceeds three minutes, the application is marked as the application that is unable to be cleaned up. In an implementation, "1" is the sample tag indicative of that the application is able to be cleaned up, "0" is the sample tag indicative of that the application is unable to be cleaned up, and vice versa.

At block 202, extract, according to a predetermined rule, feature information from the sample set to construct multiple training sets.

For example, each time preset number pieces of feature information can be obtained by performing a random extraction with replacement on the multi-dimensional feature information contained in each sample to construct a corresponding sub-sample, where each training set is constructed with multiple sub-samples, and the multiple training sets are constructed after performing the extraction a number of times. The preset number can be customized according to actual needs.

Since the feature information is obtained by performing the random extraction with replacement, different training sets may include same feature information, and same feature information may be repeated in the training set, thereby effectively avoiding overfitting of a training result.

Since the training set is formed by extracting part of feature information in each sample in the sample set, the number of the sub-samples in the training set is the same as that of the samples in the sample set.

For example, if the sample set includes 100 samples and each sample includes 15 pieces of feature information, five pieces of feature information are randomly extracted from each sample in the sample set to construct a corresponding sub-sample, then 100 sub-samples can be constructed, where each sub-sample includes 5 pieces of feature information randomly extracted, and one training set is constructed with the 100 sub-samples.

After the sub-sample corresponding to each sample is constructed, each sub-sample can be marked with a sample tag of a corresponding sample. For example, if a sample tag of a sample 1 is indicative of that the application is able to be cleaned up, a sample tag of a sub-sample corresponding to the sample 1 is also indicative of that the application is able to be cleaned up.

In an implementation, the multi-dimensional feature information associated with the application may include Q pieces of feature information. The preset number may be q, and the number of the training sets constructed can be determined with an equation $$M = \frac{C_Q^q}{2},$$

where M represents the number of the training sets.

It is to be understood that according to the principle of random combination, if q pieces of feature information are extracted from Q pieces of feature information in each sample, there are $C_Q^q$ combinations. In an implementation of the present disclosure, the number of the training sets (i.e., the number of times the random extraction is performed) is determined as $$\frac{C_Q^q}{2},$$

and thus not only the amount of computation can be reduced, but also the number of the decision trees can be ensured, accordingly, the accuracy of prediction can be increased.

At block 203, each training set is trained to generate a corresponding decision tree.

Figure 3:
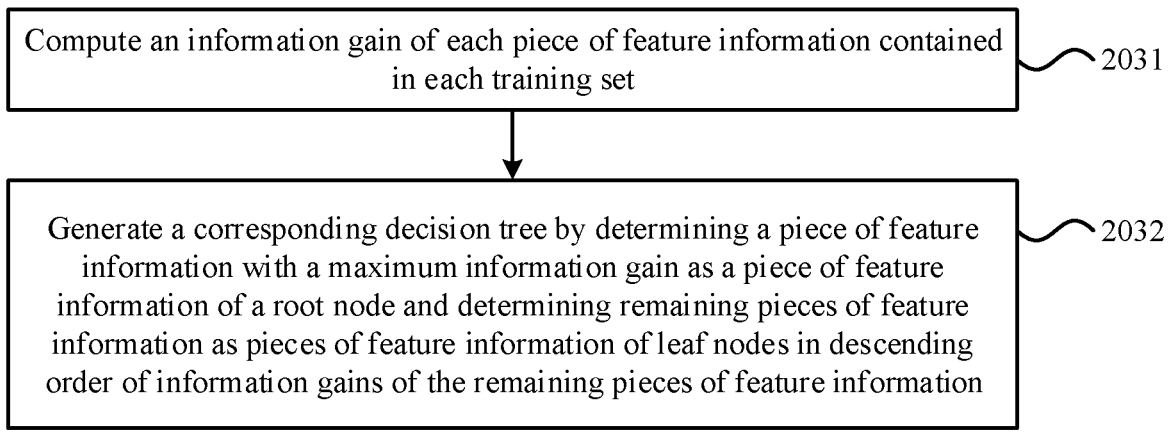
FIG. 3 is a schematic flow chart illustrating a method for generating a decision tree according to an implementation of the present disclosure.

Referring to FIG. 3, a specific training method is as follows.

At block 2031, an information gain of each piece of feature information contained in each training set is computed.

In an implementation, the information gain of each piece of feature information contained in each training set is computed with an equation g(S, K)=H(S)−H(S|K), where g(S, K) represents an information gain of feature information K contained in a training set S, H(S) represents entropy of the training set S, and H(S|K) represents entropy of the training set S after dividing the training set S with the feature information K. $H(S) = -\Sigma_{i=1}^{n} P_i \cdot \log P_i$, where $P_i$ represents a probability that a predicted result of $i^{th}$ category appears in the training set S, and n represents predicted result categories. In the implementation, the predicted results include two types of predicted results, i.e., the predicted results indicative of that the application is able to be cleaned up and the predicted results indicative of that the application is unable to be cleaned up, and thus n is 2. For example, in the training set S, ten samples are included, that is, ten pieces of multi-dimensional feature data associated with the application are included, where the number of the sample tags indicative of that the application is able to be cleaned up is seven, the number of the sample tags indicative of that the application is unable to be cleaned up is three, and then the entropy of the training set S is $$H(S) = -\frac{7}{10}\log\frac{7}{10} - \frac{3}{10}\log\frac{3}{10}. \quad H(S\mid K) = \sum_{i=1}^{n} P_i \cdot H(Y\mid K = K_i),$$

where $H(Y|K=K_i)$ represents conditional entropy of the training set S when the feature information K is fixed to be $K_i$. For example, in the training set S, ten samples are included. In such a case that the training set S is classified with application types, when the application type is the first level, sample tags for four samples are indicative of that the application is unable to be cleaned up, and sample tags for three samples are indicative of that the application is able to be cleaned up, and when the application type is the second level, sample tags for the remaining three samples are indicative of that the application is able to be cleaned up, then the entropy of the training set S after dividing the training set S with the feature of application type is $$H(S\mid K) = \frac{7}{10} * \left(-\frac{4}{7}\log\frac{4}{7} - \frac{3}{7}\log\frac{3}{7}\right) + \frac{3}{10}\left(-\frac{3}{3}\log\frac{3}{3}\right).$$

At block 2032, a corresponding decision tree is generated by determining a piece of feature information with a maximum information gain as a piece of feature information of a root node and determining remaining pieces of feature information as pieces of feature information of leaf nodes in descending order of information gains of the remaining pieces of feature information.

According to the above method, each training set is trained, and the decision trees are obtained, where the number of the decision trees is the same as that of the training sets. For example, when the number of the training sets is $$\frac{C_Q^q}{2}, \frac{C_Q^q}{2}$$

decision trees can be obtained.

A random forest is constructed with the decision trees generated. In the implementation, prediction of the application is performed with the random forest constructed.

In some implementations, the operations at block 201 to block 203 can be repeated to construct random forests for different applications. In some implementations, constructing the random forest can be performed in a server in advance. For example, the electronic device can transmit sample data associated with each application to the server, and the server processes the sample data associated with each application to generate a corresponding random forest for each application. When it needs to predict whether a certain application can be cleaned up, the electronic device can acquire a corresponding random forest from the server, and perform a prediction operation on the application with the random forest acquired.

At bock 204, when the application is switched to the background, current feature information associated with the application is predicted with the decision trees generated and multiple predicted results are output, where the predicted results include predicted results indicative of that the application is able to be cleaned up and predicted results indicative of that the application is unable to be cleaned up.

What needs to be illustrated is that the current feature information associated with the application and the multi-dimensional feature information associated with the application collected for constructing the samples have the same dimensions, where the two may have the same or different corresponding parameters in each dimension.

With any of the decision trees, the current feature information associated with the application is predicted as follows.

First, feature information corresponding to splitting features of a root node of the decision tree is extracted from the multi-dimensional feature information associated with the application. The feature information extracted is determined according to a splitting condition of the root node of the decision tree to get a root node decision result. If the root node decision result meets a condition of stopping traversal (for example, it is clear whether the application can be cleaned up), the predicted result of the application is output, otherwise, a leaf node to be traversed is determined according to the root node decision result.

Following, feature information corresponding to splitting features of the leaf node determined is extracted from the multi-dimensional feature information associated with the application. The feature information extracted is determined according to a splitting condition of the leaf node to get a leaf node decision result. If the leaf node decision result meets the condition of stopping traversal (for example, it is clear whether the application can be cleaned up), the predicted result of the application is output, otherwise, a next leaf node to be traversed is determined according to the leaf node decision result.

The above operations are repeated until all the predicted results of the application are obtained.

With each decision tree, one predicted result of the application is output. With $$\frac{C_Q^q}{2}$$

decision trees, $$\frac{C_Q^q}{2}$$

predicted results can be output.

At block 205, whether the application is able to be cleaned up is determined according to the multiple predicted results.

After obtaining the predicted results determined with all the decision trees, a ratio of the number of the predicted results indicative of that the application is able to be cleaned up to the number of all the predicted results is calculated and determined as a cleanable probability, and a ratio of the number of the predicted results indicative of that the application is unable to be cleaned up to the number of all the predicted results is calculated and determined as a maintaining probability. When the cleanable probability of the application is larger than the maintaining probability of the application, it is determined that the application is able to be cleaned up, and when the maintaining probability of the application is larger than the cleanable probability of the application, it is determined that the application is kept to be in the background.

In some implementations, when multiple applications are in the background, a forest for each application can be used to predict each application, and determine whether each application is able to be cleaned up according to the predicted results of each application. Cleanable probabilities of applications that can be cleaned up are obtained. Preset number applications are selected from the multiple applications in descending order of the cleanable probabilities of the multiple applications and the applications selected are cleaned up, or applications each with a cleanable probability larger than a preset probability are selected from the multiple applications and the applications selected are cleaned up.

At block 206, clean up the application upon determining that the application is able to be cleaned up.

In an implementation, the multi-dimensional feature information associated with the application is collected as the samples and the sample set associated with the application is constructed according to the samples. The feature information is extracted from the sample set according to the predetermined rule to construct the multiple training sets. Each training set is trained to generate a corresponding decision tree. When the application is switched to the background, the current feature information associated with the application is predicted with the decision trees generated and the multiple predicted results are output. Whether the application can be cleaned up is determined according to the multiple predicted results. The application that is able to be cleaned up is cleaned up, and thus the application in the background can be automatically cleaned up, thereby ensuring smooth running of the electronic device and reducing power consumption.

Furthermore, since each sample in the sample set includes multiple pieces of feature information indicative of habits of using the application, in the implementation of the present disclosure cleaning up a corresponding application can be personalized.

Furthermore, the samples are constructed according to the multi-dimension feature information associated with each application, the decision trees are generated to construct the random forest, whether each application is able to be cleaned up is predicted with the current feature information of each application and a corresponding random forest, and thus the accuracy of cleaning up each application can be increased.

Figure 4A:
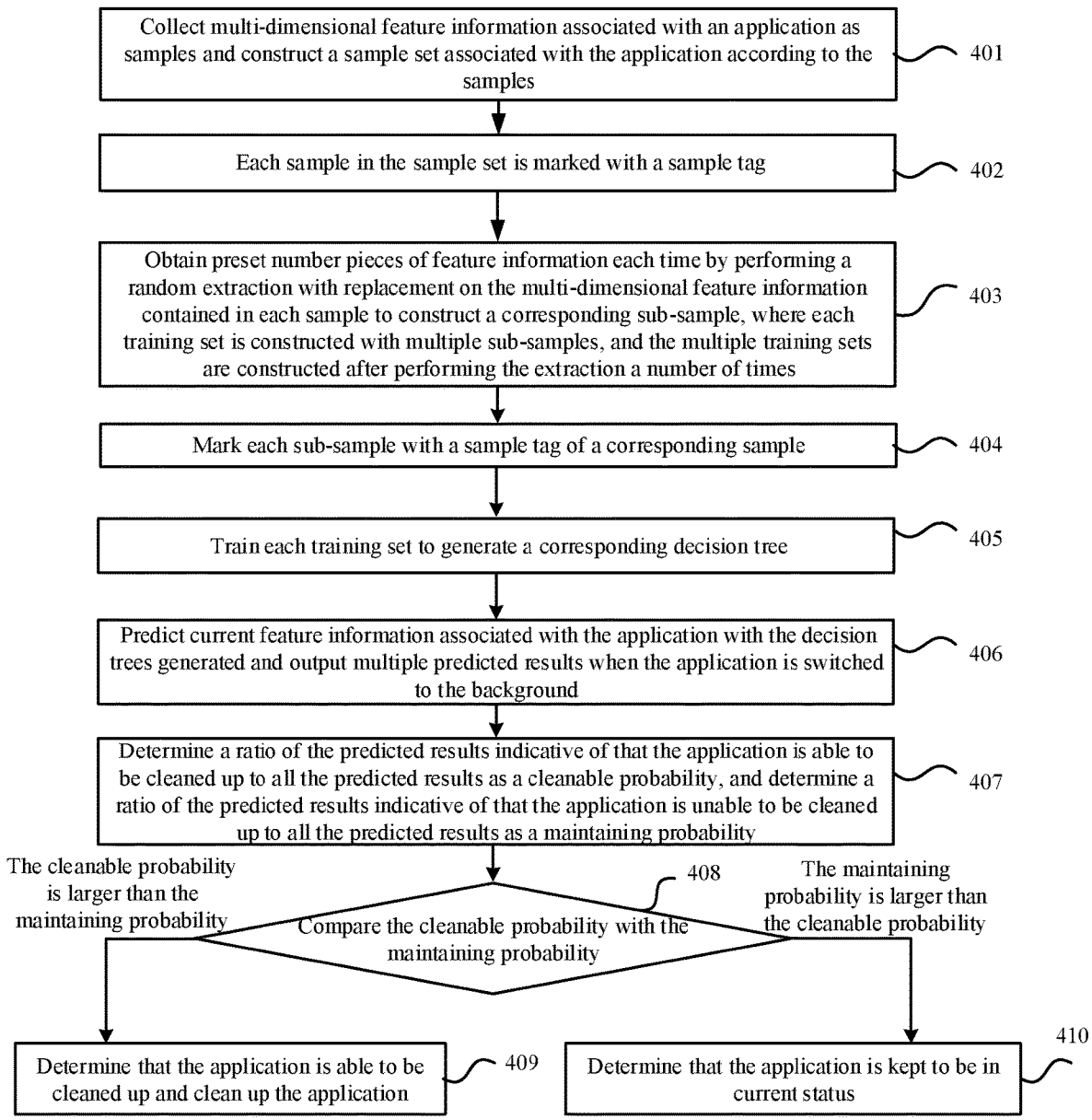
FIG. 4A is a schematic flow chart illustrating a method for cleaning up a background application according to another implementation of the present disclosure.

In an implementation, another method for cleaning up a background application is provided. As illustrated in FIG. 4A, the method in the implementation is as follows.

At block 401, multi-dimensional feature information associated with an application is collected as samples and a sample set associated with the application is constructed according to the samples.

The application referred to in the implementation may be any application in an electronic device, such as an office application, a communication application, a game application, a shopping application, or the like.

The multi-dimensional feature information associated with the application has dimensions of a certain length, and parameters in each dimension correspond to a type of feature information representing the application, that is, the multi-dimensional feature information is consisted of multiple pieces of feature information. The multiple pieces of feature information may include feature information related to the application itself, for example, duration that the application is in the background, duration of screen-off of the electronic device during the process that the application is in the background, the number of times the application is switched to the foreground, duration that the application is in the foreground, a manner in which the application is switched to the background, such as being switched to the background in response to an operation on a home button, being switched to the background in response to an operation on a back button, being switched to the background via other applications, etc., and the type of the application, such as a first level (common application), a second level (other application), etc. The multiple pieces of feature information may also include feature information of the electronic device having the application, for example, duration of screen-off of the electronic device, duration of screen-on of the electronic device, current remaining battery capacity of the electronic device, wireless network connection status of the electronic device, feature information indicating whether the electronic device is in charging status or not.

The sample set associated with the application may include multiple samples collected according to a preset frequency within a historical time period. The historical time period may be, for example, the past seven or ten days. The preset frequency may be, for example, collecting every ten minutes or collecting every half an hour. It can be understood that the multi-dimensional feature data associated with the application collected each time is used to construct a sample, and multiple samples are used to construct the sample set.

A specific sample is illustrated in a table 1. The sample includes feature information of multiple dimensions. What needs to be illustrated is that the feature information illustrated in table 1 is just an example. In practice, the number of pieces of feature information in a sample can be larger than or smaller than that of pieces of feature information illustrated in the table 1, and detailed feature information can be different from feature information illustrated in the table 1, and there is no specific restriction herein.

TABLE 1

| Dimension | Feature information |
|---|---|
| 1 | Duration that an application is in the background |
| 2 | Duration of screen-off of an electronic device during the process that the application is in the background |
| 3 | The number of times the application is switched to the foreground every day |
| 4 | Duration that the application is in the foreground every day |
| 5 | A manner in which the application is switched to the background, such as being switched to the background in response to an operation on a home button, being switched to the background in response to an operation on a back button, being switched to the background via other applications, etc. |
| 6 | The type of the application, such as a first level (common application), a second level (other application) |
| 7 | Duration of screen-on of the electronic device |
| 8 | Duration of screen-off of the electronic device |
| 9 | Current remaining battery capacity of the electronic device |
| 10 | Current wireless network status |
| 11 | Duration that the application is in the foreground each time |
| 12 | A time interval between a time point at which a current foreground application is switched to the background and a time point at which a target application is switched to the foreground |
| 13 | An average time length of screen-off during a period in which the current foreground application is switched to the background and the target application is switched to the foreground |
| 14 | A ratio of the number of times within each preset region of a histogram associated with the duration of the application in the background |
| 15 | Whether the electronic device is in charging status |

At block 402, each sample in the sample set is marked with a sample tag to obtain multiple sample tags.

Since in the implementation what needs to be achieved is to predict whether the application can be cleaned up, the sample tags include sample tags indicative of that the application is able to be cleaned up and sample tags indicative of that the application is unable to be cleaned up. In an implementation, marking can be performed according to historical usage habits associated with the application. For example, if the application is closed at a time point duration that the application is in the background reaches or exceeds 30 minutes, the application is marked as the application that is able to be cleaned up. For another example, if the application is switched to the foreground at a time point duration that the application is in the background reaches or exceeds three minutes, the application is marked as the application that is unable to be cleaned up. In an implementation, "1" is a sample tag indicative of that the application is able to be cleaned up, "0" is a sample tag indicative of that the application is unable to be cleaned up, and vice versa.

At block 403, each time preset number pieces of feature information are obtained by performing a random extraction with replacement on the multi-dimensional feature information contained in each sample to construct a corresponding sub-sample, where each training set is constructed with multiple sub-samples, and the multiple training sets are constructed after performing the extraction a number of times.

In an implementation, for example, as illustrated in the table 1, the multi-dimensional feature information associated with each application includes 15 pieces of feature information, and each time five pieces of feature information can be extracted from each sample by performing the random extraction with replacement to construct a corresponding sub-sample. A sub-sample constructed according to the sample illustrated in the table 1 is illustrated in a table 2.

TABLE 2

| Dimension | Feature information |
|---|---|
| 1 | Duration that the application is in the background |
| 2 | Current remaining battery capacity of the electronic device |
| 3 | The number of times the application is switched to the foreground every day |
| 4 | The type of the application, such as the first level (common application), the second level (other application) |
| 5 | Current wireless network status |

Each training set is constructed with multiple sub-samples, and the multiple training sets are constructed after performing the extraction a number of times, where the number of the training sets constructed is $$M = \frac{C_{15}^5}{2}.$$

Since the training set is formed by extracting part of feature information in each sample in the sample set, the number of the sub-samples in the training set is the same as that of the samples in the sample set.

At block 404, each sub-sample is marked with a sample tag of a corresponding sample.

For example, if the sample tag of the sample illustrated in table 1 is indicative of that the application is able to be cleaned up, the sample tag of the sub-sample illustrated in FIG. 2 is also indicative of that the application is able to be cleaned up.

At block 405, each training set is trained to generate a corresponding decision tree.

In an implementation, for each training set, an information gain of each piece of feature information contained in the training set is computed with an equation $g(S, K)=H(S)-H(S|K)$, where $g(S, K)$ represents an information gain of feature information K contained in a training set S, H(S) represents entropy of the training set S, and H(S|K) represents entropy of the training set S after dividing the training set S with the feature information K. $H(S)=-\Sigma_{i=1}^{n}P_i \cdot \log P_i$, where $P_i$ represents a probability that a predicted result of $i^{th}$ category appears in the training set S, and n represents predicted result categories. In the implementation, the predicted results include two types of predicted results, i.e., the predicted results indicative of that the application is able to be cleaned up and the predicted results indicative of that the application is unable to be cleaned up, and thus n is 2. $H(S|K)=\Sigma_{i=1}^{n}P_i \cdot H(Y|K=K_i)$, where $H(Y|K=K_i)$ represents conditional entropy of the training set S when the feature information K is fixed to be $K_i$.

After the information gain of each piece of feature information is obtained, a corresponding decision tree is generated by determining a piece of feature information with a maximum information gain as a piece of feature information of a root node and determining remaining pieces of feature information as pieces of feature information of leaf nodes in descending order of information gains of the remaining pieces of feature information.

For example, each sub-sample in one training set is illustrated in the table 2. Each sub-sample includes five pieces of feature information, i.e., the duration that the application is in the background, the current remaining battery capacity of the electronic device, the number of times the application is switched to the foreground, the type of the application, the current wireless network status, and thus after training the decision tree illustrated in FIG. 4C can be generated.

Figure 4B:
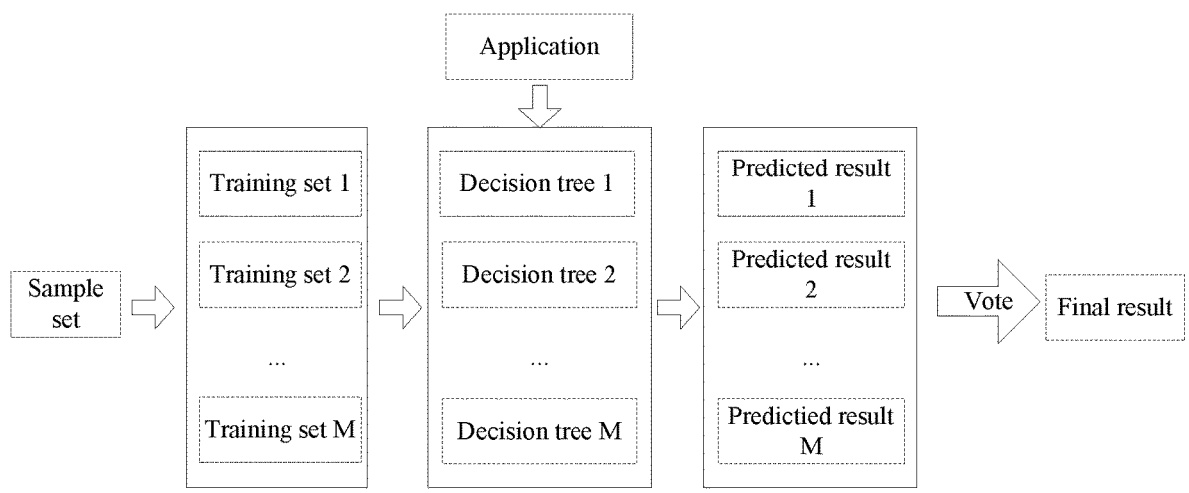
FIG. 4B is a schematic flow chart illustrating a method for cleaning up a background application according to another implementation of the present disclosure.

According to the above method, each training set is trained, and the decision trees can be obtained, where the number of the decision trees is equal to that of the training sets. As illustrated in FIG. 4B, for example, when the number M of the training sets is $$\frac{C_{15}^5}{2}, \frac{C_{15}^5}{2}$$

decision trees are obtained, and one random forest can be constructed with the $$\frac{C_{15}^5}{2}$$

decision trees.

At block 406, when the application is switched to the background, current feature information associated with the application is predicted with the decision trees generated and multiple predicted results are output.

What needs to be illustrated is that the current feature information associated with the application and the multi-dimensional feature information associated with the application collected for constructing the samples have the same dimensions, where the two may have the same or different corresponding parameters in each dimension.

Figure 4C:
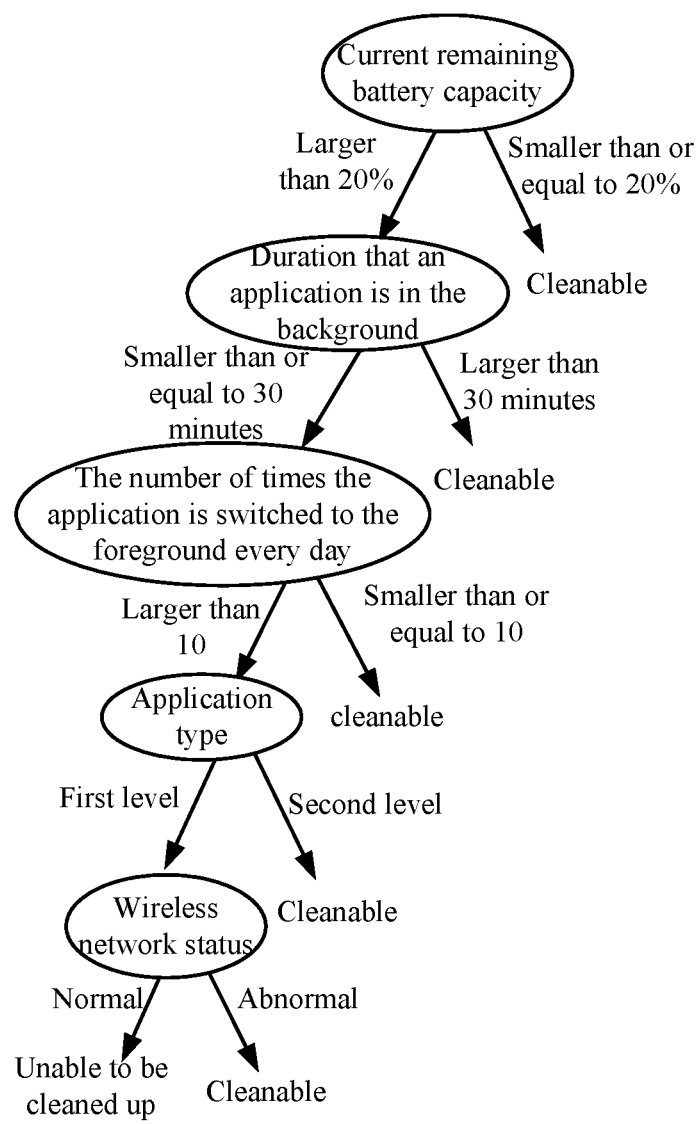
FIG. 4C is a schematic structural diagram illustrating a decision tree generated according to an implementation of the present disclosure.

For example, multi-dimensional feature information associated with an application includes the following: current remaining battery capacity is 30%, duration that the application is in the background is 10 minutes, the number of times the application is switched to the background every day is 15, an application type is a first level, and wireless network status is normal, and thus the predicted result of the application predicted with the decision tree as illustrated in FIG. 4C is that the application is able to be cleaned up.

In the above examples, $$\frac{C_{15}^5}{2}$$

decision trees are used to predict an application, and $$\frac{C_{15}^5}{2}$$

predicted results are output, where the predicted results may include the predicted results indicative of that the application is able to be cleaned up and the predicted results indicative of that the application is unable to be cleaned up.

At block 407, a ratio of the number of the predicted results indicative of that the application is able to be cleaned up to the number of all the predicted results is calculated and determined as a cleanable probability, and a ratio of the number of the predicted results indicative of that the application is unable to be cleaned up to the number of all the predicted results is calculated and determined as a maintaining probability.

At block 408, the cleanable probability is compared with the maintaining probability. When the cleanable probability is larger than the maintaining probability, an operation at block 409 is executed, and when the maintaining probability is larger than the cleanable probability, an operation at block 410 is executed.

At block 409, it is determined that the application is able to be cleaned up and the application is cleaned up.

At block 410, it is determined that the application is kept to be in current status.

For example, if multiple applications are in the background, each application is predicted with a corresponding random forest. Predictions results are illustrated in a table 3. From the table 3, it can be determined that applications A1 and A3 can be cleaned up, and an application A2 is kept to be in the background.

TABLE 3

| Background application | Prediction result | |
|---|---|---|
| | Able to be cleaned up (probability) | Unable to be cleaned up (probability) |
| Application A1 | 0.8 | 0.2 |
| Application A2 | 0.1 | 0.9 |
| Application A3 | 0.7 | 0.3 |

In the implementation, the multi-dimensional feature information associated with the application is collected as the samples and the sample set associated with the application is constructed according to the samples. The feature information is extracted from the sample set according to the predetermined rule to construct the multiple training sets. Each training set is trained to generate a corresponding decision tree. When the application is switched to the background, the current feature information associated with the application is predicted with the decision trees generated and the multiple predicted results are output. Whether the application can be cleaned up is determined according to the multiple predicted results. The application that is able to be cleaned up is cleaned up, and thus the application in the background can be automatically cleaned up, thereby ensuring smooth running of the electronic device and reducing power consumption.

Implementations of the present disclosure further provide a device for cleaning up a background application. The device includes a collecting unit, an extracting unit, a training unit, a predicting unit, and a first determining unit.

The collecting unit is configured to collect multi-dimensional feature information associated with an application as samples and construct a sample set associated with the application according to the samples. The extracting unit is configured to extract, according to a predetermined rule, feature information from the sample set to construct multiple training sets. The training unit is configured to train each of the training sets to generate a corresponding decision tree. The predicting unit is configured to predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. The first determining unit is configured to determine whether the application is able to be cleaned up according to the multiple predicted results.

In an implementation, the training unit includes a computing sub-unit configured to compute an information gain of each piece of feature information contained in each training set, and a generating sub-unit configured to generate a corresponding decision tree by determining a piece of feature information with a maximum information gain as a piece of feature information of a root node and determining remaining pieces of feature information as pieces of feature information of leaf nodes in descending order of information gains of the remaining pieces of feature information.

In an implementation, the computing sub-unit is configured to compute the information gain of each piece of feature information contained in each training set with an equation g(S, K)=H(S)−H(S|K), where g(S, K) represents an information gain of feature information K contained in a training set S, H(S) represents entropy of the training set S, and H(S|K) represents entropy of the training set S after dividing the training set S with the feature information K. $H(S) = -\Sigma_{i=1}^{n} P_i \cdot \log P_i$, where $P_i$ represents a probability that a predicted result of $i^{th}$ category appears in the training set S, and n represents predicted result categories. $H(S|K) = \Sigma_{i=1}^{n} P_i \cdot H(Y|K=K_i)$, where $H(Y|K=K_i)$ represents conditional entropy of the training set S when the feature information K is fixed to be $K_i$.

In an implementation, the extracting unit is configured to extract preset number pieces of feature information each time by performing a random extraction with replacement on the multi-dimensional feature information contained in each sample to construct a corresponding sub-sample, where each training set is constructed with multiple sub-samples, and the multiple training sets are constructed after performing the extraction a number of times.

The multi-dimensional feature information associated with the application may include Q pieces of feature information. The preset number may be q. The device may further include a second determining unit configured to determine the number of the constructed training sets with an equation $$M = \frac{C_Q^q}{2},$$

where M represents the number of the training sets.

In an implementation, the device further includes a marking unit configured to mark each sample in the sample set with a sample tag to obtain multiple sample tags, and mark each sub-sample with a sample tag of a corresponding sample, where the sample tags include sample tags indicative of that the application is able to be cleaned up and sample tags indicative of that the application is unable to be cleaned up.

In an implementation, the first determining unit includes a calculating sub-unit and a determining sub-unit. The calculating sub-unit is configured to determine a ratio of the number of the predicted results indicative of that the application is able to be cleaned up to the number of all the predicted results as a cleanable probability, and determine a ratio of the number of the predicted results indicative of that the application is unable to be cleaned up to the number of all the predicted results as a maintaining probability. The determining sub-unit is configured to determine that the application is able to be cleaned up when the cleanable probability of the application is larger than the maintaining probability of the application, and determine that the application is kept to be in the background when the maintaining probability of the application is larger than the cleanable probability of the application.

In an implementation, multiple applications of the electronic device are in the background. The device further includes a cleaning unit configured to select preset number applications from the multiple applications in descending order of cleanable probabilities of the multiple applications and clean up the applications selected, or select applications each with a cleanable probability larger than a preset probability from the multiple applications and clean up the applications selected.

In an implementation, the collecting unit is configured to collect the multiple-dimensional feature information associated with the application once every preset time interval, where the multiple-dimensional feature information associated with the application includes feature information associated with running of the application and/or status feature information of the electronic device. The collecting unit is further configured to determine the multiple-dimensional feature information associated with the application collected each time as one of the samples, and acquire the multiple samples within a preset historical time period to construct the sample set.

In an implementation, the device further includes a transmitting unit configured to transmit the sample set associated with the application to a server, and a receiving unit configured to receive the multiple decision trees from the server.

Figure 5:
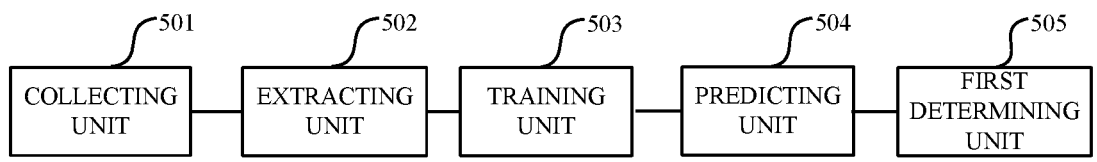
FIG. 5 is a schematic structural diagram illustrating a device for cleaning up a background application according to an implementation of the present disclosure.

Implementations of the present disclosure further provide a device for cleaning up a background application. The device for cleaning up the application in the background is applied to an electronic device. As illustrated in FIG. 5, the device for cleaning up a background application includes a collecting unit 501, an extracting unit 502, a training unit 503, a predicting unit 504, and a first determining unit 505.

The collecting unit 501 is configured to collect multi-dimensional feature information associated with an application as samples and construct a sample set associated with the application according to the samples. The extracting unit 502 is configured to extract, according to a predetermined rule, feature information from the sample set to construct multiple training sets. The training unit 503 is configured to train each of the training sets to generate a corresponding decision tree. The predicting unit 504 is configured to predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. The first determining unit 505 is configured to determine whether the application is able to be cleaned up according to the multiple predicted results.

Figure 6:
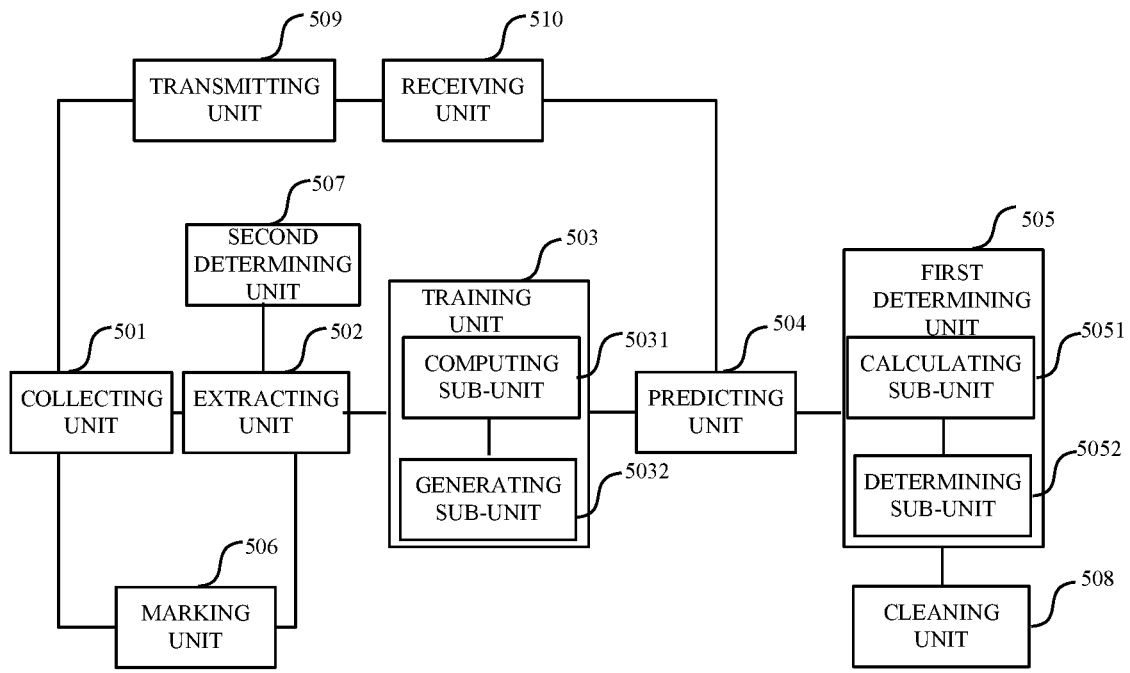
FIG. 6 is a schematic structural diagram illustrating a device for cleaning up a background application according to another implementation of the present disclosure.

In some implementations, as illustrated in FIG. 6, the training unit 503 includes a computing sub-unit 5031 configured to compute an information gain of each piece of feature information contained in each training set, and a generating sub-unit 5032 configured to generate a corresponding decision tree by determining a piece of feature information with a maximum information gain as a piece of feature information of a root node and determining remaining pieces of feature information as pieces of feature information of leaf nodes in descending order of information gains of the remaining pieces of feature information.

In some implementations, the computing sub-unit 5031 is configured to compute the information gain of each piece of feature information contained in each training set with an equation g(S, K)=H(S)−H(S|K), where g(S, K) represents an information gain of feature information K contained in a training set S, H(S) represents entropy of the training set S, and H(S|K) represents entropy of the training set S after dividing the training set S with the feature information K. $H(S) = -\Sigma_{i=1}^{n} P_i \cdot \log P_i$, where $P_i$ represents a probability that a predicted result of $i^{th}$ category appears in the training set S, and n represents predicted result categories. $H(S|K) = \Sigma_{i=1}^{n} P_i \cdot H(Y|K=K_i)$, where $H(Y|K=K_i)$ represents conditional entropy of the training set S when the feature information K is fixed to be $K_i$.

In some implementations, the extracting unit 502 is configured to extract preset number pieces of feature information each time by performing a random extraction with replacement on the multi-dimensional feature information contained in each sample to construct a corresponding sub-sample, where each training set is constructed with multiple sub-samples, and the multiple training sets are constructed after performing the extraction a number of times.

The multi-dimensional feature information associated with the application may include Q pieces of feature information. The preset number may be q. As illustrated in FIG. 6, the device further includes a second determining unit 507 configured to determine the number of the constructed training sets with an equation $$M = \frac{C_Q^q}{2},$$

where M represents the number of the training sets.

In some implementations, as illustrated in FIG. 6, the device further includes a marking unit 506 configured to mark each sample in the sample set with a sample tag to obtain multiple sample tags, and mark each sub-sample with a sample tag of a corresponding sample, where the sample tags include sample tags indicative of that the application is able to be cleaned up and sample tags indicative of that the application is unable to be cleaned up.

In some implementations, as illustrated in FIG. 6, the first determining unit 505 includes a calculating sub-unit 5051 and a determining sub-unit 5052. The calculating sub-unit 5051 is configured to determine a ratio of the number of the predicted results indicative of that the application is able to be cleaned up to the number of all the predicted results as a cleanable probability, and determine a ratio of the number of the predicted results indicative of that the application is unable to be cleaned up to the number of all the predicted results as a maintaining probability. The determining sub-unit 5052 is configured to determine that the application is able to be cleaned up when the cleanable probability of the application is larger than the maintaining probability of the application, and determine that the application is kept to be in the background when the maintaining probability of the application is larger than the cleanable probability of the application.

In some implementations, multiple applications of the electronic device are in the background. As illustrated in FIG. 6, the device further includes a cleaning unit 508 configured to select preset number applications from the multiple applications in descending order of cleanable probabilities of the multiple applications and clean up the applications selected, or select applications each with a cleanable probability larger than a preset probability from the multiple applications and clean up the applications selected.

In some implementations, the collecting unit 501 is configured to collect the multiple-dimensional feature information associated with the application once every preset time interval, where the multiple-dimensional feature information associated with the application includes feature information associated with running of the application and/or status feature information of the electronic device. The collecting unit 501 is further configured to determine the multiple-dimensional feature information associated with the application collected each time as one of the samples, and acquire the multiple samples within a preset historical time period to construct the sample set.

In some implementations, as illustrated in FIG. 6, the device further includes a transmitting unit 509 configured to transmit the sample set associated with the application to a server, and a receiving unit 510 configured to receive the multiple decision trees from the server.

From the above it can be known that for the electronic device in the implementation, the collecting unit 501 collects the multi-dimensional feature information associated with the application as the samples and constructs the sample set associated with the application according to the samples. The extracting unit 502 is configured to extract, according to the predetermined rule, the feature information from the sample set to construct the multiple training sets. The training unit 503 is configured to train each of the training sets to generate a corresponding decision tree. The predicting unit 504 is configured to predict, with multiple decision trees generated, the current feature information associated with the application and output the multiple predicted results when the application is switched to the background. Finally, the determining unit 505 determines whether the application is able to be cleaned up according to the multiple predicted results and clean up the application cleanable, and thus the application in the background can be automatically cleaned up, thereby ensuring smooth running of the electronic device and reducing power consumption.

In the implementations, the above modules may be implemented as independent entities, or may be arbitrarily combined to be implemented as one entity or several entities. For the implementations of the above modules, reference can be made to the foregoing method implementations, and details are not repeated herein.

Figure 7:
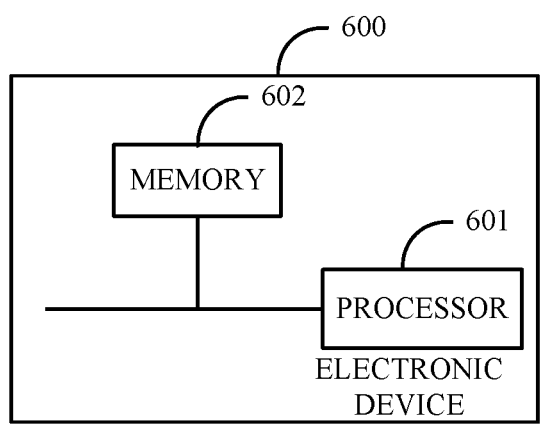
FIG. 7 is a schematic structural diagram illustrating an electronic device according to an implementation of the present disclosure.

Implementations of the present disclosure further provide an electronic device. As illustrated in FIG. 7, an electronic device 600 includes a processor 601 and a memory 602. The processor 601 is electrically coupled with the memory 602.

The processor 601 is a control center of the electronic device 600, and uses various interfaces and lines to connect various parts of the electronic device 600. By running or loading computer programs in the memory 602 and calling data in the memory 602, various functions of the electronic device 600 are performed and data is processed, thereby realizing overall monitoring of the electronic device 600.

The memory 602 may be used to store software programs and modules. The processor 601 executes various functional applications and data processing by running the computer programs and modules stored in the memory 602. The memory 602 may mainly include a program storage area and a data storage area, where the program storage area may store an operating system, computer programs required for at least one function, such as a sound playback function, an image playback function, etc. The data storage area may store data created according to usage of the electronic device. In addition, the memory 602 may include a high-speed random access memory, and may further include a non-volatile memory, such as at least one magnetic disk storage device, a flash memory device, or other volatile solid-state storage devices. Accordingly, the memory 602 may further include a memory controller to provide the processor 601 with an access to the memory 602.

In the implementation of the present disclosure, the processor 601 of the electronic device 600 loads instructions corresponding to processes of one or more of the above computer programs into the memory 602 according to the following operation, and the processor 601 runs the computer programs in the memory 602 to achieve various functions illustrated as follows.

Collect multi-dimensional feature information associated with an application as samples and construct a sample set associated with the application according to the samples. Extract, according to a predetermined rule, feature information from the sample set to construct multiple training sets. Train each of the training sets to generate a corresponding decision tree, and predict, with multiple decision trees generated, current feature information associated with the application and output multiple predicted results when the application is switched to the background, where the predicted results include predicted results indicative of that the application is able to be cleaned up and predicted results indicative of that the application is unable to be cleaned up. Determine whether the application is able to be cleaned up according to the multiple predicted results. Clean up the application upon determining that the application is able to be cleaned up.

In some implementation, the processor 601 configured to train each training set to generate a corresponding tree is configured to compute an information gain of each piece of feature information contained in each training set, and generate a corresponding decision tree by determining a piece of feature information with a maximum information gain as a piece of feature information of a root node and determining remaining pieces of feature information as pieces of feature information of leaf nodes in descending order of information gains of the remaining pieces of feature information.

In some implementations, the processor 601 configured to compute the information gain of each piece of feature information contained in each training set is configured to compute the information gain of each piece of feature information contained in each training set with an equation $g(S, K)=H(S)-H(S|K)$, where $g(S, K)$ represents an information gain of feature information K contained in a training set S, $H(S)$ represents entropy of the training set S, and $H(S|K)$ represents entropy of the training set S after dividing the training set S with the feature information K. $H(S)=-\Sigma_{i=1}^{n}P_i \cdot \log P_i$, where $P_i$ represents a probability that a predicted result of $i^{th}$ category appears in the training set S, and n represents predicted result categories. $H(S|K)=\Sigma_{i=1}^{n}P_i \cdot H(Y|K=K_i)$, where $H(Y|K=K_i)$ represents conditional entropy of the training set S when the feature information K is fixed to be $K_i$.

In some implementations, the processor 601 configured to extract the feature information from the sample set according to the predetermined rule to construct the multiple training sets is configured to extract preset number pieces of feature information each time by performing a random extraction with replacement on the multi-dimensional feature information contained in each sample to construct a corresponding sub-sample, where each training set is constructed with multiple sub-samples, and the multiple training sets are constructed after performing the extraction a number of times.

The multi-dimensional feature information associated with the application may include Q pieces of feature information. The preset number may be q. The processor 601 further performs the following. Determine the number of the constructed training sets with an equation $$M = \frac{C_Q^q}{2},$$

where M represents the number of the training sets.

In some implementations, after collecting the multi-dimensional feature information associated with the application as the samples, the processor 601 further performs the following. Mark each sample in the sample set with a sample tag to obtain multiple sample tags, where the sample tags include sample tags indicative of that the application is able to be cleaned up and sample tags indicative of that the application is unable to be cleaned up. After constructing a corresponding sub-sample, the processor 601 further performs the following. Mark each sub-sample with a sample tag of a corresponding sample.

In some implementations, the processor 601 configured to determine whether the application is able to be cleaned up according to the multiple predicted results is configured to determine a ratio of the number of the predicted results indicative of that the application is able to be cleaned up to the number of all the predicted results as a cleanable probability, determine a ratio of the number of the predicted results indicative of that the application is unable to be cleaned up to the number of all the predicted results as a maintaining probability, determine that the application is able to be cleaned up when the cleanable probability of the application is larger than the maintaining probability of the application, and determine that the application is kept to be in the background when the maintaining probability of the application is larger than the cleanable probability.

In some implementations, when multiple applications are in the background, the processor 601 further performs the following. Select preset number applications from the multiple applications in descending order of cleanable probabilities of the multiple applications and clean up the applications selected, or select applications each with a cleanable probability larger than a preset probability from the multiple applications and clean up the applications selected.

In some implementations, the processor 601 configured to collect the multi-dimensional feature information associated with the application as the samples to construct the sample set associated with the application is configured to collect the multiple-dimensional feature information associated with the application once every preset time interval, where the multi-dimensional feature information associated with the application includes feature information associated with running of the application and/or status feature information of the electronic device, determine the multiple-dimensional feature information associated with the application collected each time as one of the samples, and acquire the multiple samples within a preset historical time period to construct the sample set.

In some implementations, after collecting the multi-dimensional feature information associated with the application as the samples to construct the sample set associated with the application, the processor 601 further performs the following. Transmit the sample set associated with the application to a server, and receive the multiple decision trees from the server.

From the above it can be known that for the electronic device in the implementation of the present disclosure, collect the multi-dimensional feature information associated with the application as the samples and construct the sample set associated with the application according to the samples. Extract, according to the predetermined rule, the feature information from the sample set to construct the multiple training sets. Train each of the training sets to generate a corresponding decision tree. Predict, with the multiple decision trees generated, the current feature information associated with the application and output the multiple predicted results when the application is switched to the background. Determine whether the application is able to be cleaned up according to the multiple predicted results and clean up the application cleanable, and thus the application in the background can be automatically cleaned up, thereby ensuring smooth running of the electronic device and reducing power consumption.

Figure 8:
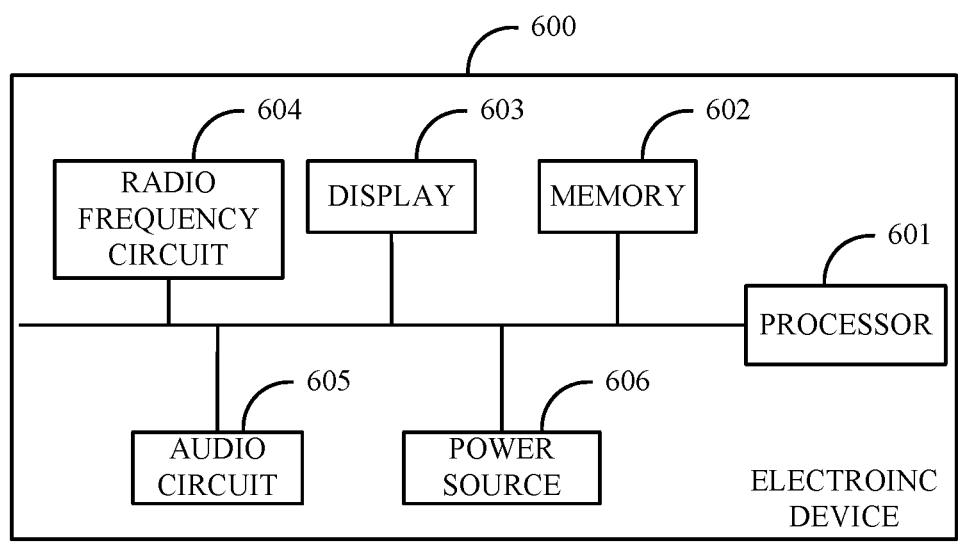
FIG. 8 is a schematic structural diagram illustrating an electronic device according to another implementation of the present disclosure.

Referring to FIG. 8, in some implementations, the electronic device 600 further includes a display 603, a radio frequency circuit 604, an audio circuit 605, and a power source 606. The display 603, the radio frequency circuit 604, the audio circuit 605, and the power source 606 are electrically coupled with the processor 601.

The display 603 may display user input information, provide information and various graphical user interfaces for users. The graphical user interfaces may be formed by graphics, text, icons, videos, and any combination thereof. The display 603 may include a display panel. In some implementations, the display panel may be in the form of a liquid crystal display (LCD), an organic light-emitting diode (OLED), or other.

The radio frequency circuit 604 may be configured to transmit and receive radio frequency signals, to establish a wireless communication with network devices or other electronic devices via a wireless network and receive signals from and transmit signals to the network device or other electronic devices.

The audio circuit 605 can provide an audio interface between users and the electronic device via a speaker and a microphone.

The power source 606 can supply power to various components of the electronic device 600. In some implementations, the power source 606 can be logically coupled with the processor 601 via a power management system, thereby realizing discharging and charging management and power consumption management via the power source management system.

Although not illustrated in FIG. 8, the electronic device 600 may further include a camera, a Bluetooth module, and so on, and details are not repeated herein.

In an implementation of the present disclosure, a storage medium is further provided. The storage medium stores computer programs. When the computer programs are run in a computer, the computer is enabled to perform the method for cleaning up an application in the background in any of the above implementations. For example, collect multi-dimensional feature information associated with the application as samples and construct a sample set associated with the application according to the samples, extract, according to a predetermined rule, feature information from the sample set to construct multiple training sets, train each of the training sets to generate a corresponding decision tree, and predict, with multiple decision trees generated, current feature information associated with the application and output multiple predicted results when the application is switched to the background, and determine whether the application is able to be cleaned up according to the multiple predicted results, where the predicted results include predicted results indicative of that the application is able to be cleaned up and predicted results indicative of that the application is unable to be cleaned up.

In an implementation of the present disclosure, the storage medium may be a disc, an optical disk, a read only memory (ROM), a random access memory (RAM), or the like.

In the above implementation, descriptions of various implementations have different emphases. For some part of an implementation not described in detail, reference can be made to related descriptions of other implementations.

It should be noted that, for the method for cleaning up a background application in the implementation of the present disclosure, ordinary decision makers in the art can understand that all or part of the processes for implementing the method for cleaning up a background application in the implementation of the present disclosure can be completed by controlling related hardware via a computer program. The computer program may be stored in a computer-readable storage medium, for example, the computer program is stored in a memory of an electronic device and executed by at least one processor of the electronic device to perform the method for cleaning up a background application in the implementations. The storage medium may be a magnetic disk, an optical disk, a read-only memory, a random access memory, or the like.

For the device for cleaning up a background application in the implementation of the present disclosure, various functional modules may be integrated in a processing chip, or each functional module may exist physically, or two or more modules may be integrated in one module. The above integrated modules may be implemented in the form of hardware or software functional modules. If the integrated module is implemented in the form of a software functional module and sold or used as an independent product, the integrated module may also be stored in a computer-readable storage medium, such as a read-only memory, a magnetic disk, or an optical disk.

The method and device for cleaning up a background application, the storage medium, and the electronic device provided in the implementations of the present disclosure have been described in detail above. The specific examples are used in this specification to explain the principles and implementation of the present disclosure. The above illustration for the implementations is only used to help in understanding the method and core ideas of the present disclosure. Meanwhile, for those skilled in the art, according to the ideas of the present disclosure, there will be changes for the specific implementations and application scopes. In conclusion, the contents of the specification should not be construed as a limitation on the present disclosure.

What is claimed is:

1. A method for cleaning up a background application in an electronic device, comprising:
   collecting multi-dimensional feature information associated with an application in the electronic device as samples and constructing a sample set associated with the application according to the samples;
   extracting, according to a predetermined rule, feature information from the sample set to construct a plurality of training sets;
   training each of the plurality of training sets to generate a corresponding decision tree;
   predicting, with a plurality of decision trees generated, current feature information associated with the application and outputting a plurality of predicted results upon detecting that the application is switched to the background, wherein the plurality of predicted results comprises predicted results indicative of that the application is able to be cleaned up and predicted results indicative of that the application is unable to be cleaned up;
   determining whether the application is able to be cleaned up according to the plurality of predicted results; and
   cleaning up the application upon determining that the application is able to be cleaned up.

2. The method of claim 1, wherein training the each of the plurality of training sets to generate the corresponding decision tree comprises:
   computing an information gain of each piece of feature information contained in each of the plurality of training sets; and
   generating the corresponding decision tree by determining a piece of feature information with a maximum information gain in each of the plurality of training sets as a piece of feature information of a root node and determining remaining pieces of feature information in each of the plurality of training sets as pieces of feature information of leaf nodes in descending order of information gains of the remaining pieces of feature information.

3. The method of claim 2, wherein computing the information gain of the each piece of the feature information contained in the each of the plurality of training sets comprises:
   computing, with an equation $g(S, K)=H(S)-H(S|K)$, the information gain of each piece of feature information contained in each of the plurality of training sets, wherein $g(S, K)$ represents an information gain of feature information K contained in a training set S, $H(S)$ represents entropy of the training set S, and $H(S|K)$ represents entropy of the training set S after dividing the training set S with the feature information K, wherein $H(S)=\Sigma_{i=1}^{n} P_i \cdot \log P_i$, $P_i$ represents a probability that a predicted result of $i^{th}$ category appears in the training set S, and n represents predicted result categories, and wherein $H(S|K)=\Sigma_{i=1}^{n} P_i \cdot H(Y|K=K_i)$, $H(Y|K=K_i)$ represents conditional entropy of the training set S when the feature information K is fixed to be $K_i$.

4. The method of claim 1, wherein extracting, according to the predetermined rule, the feature information from the sample set to construct the plurality of training sets comprises:
   obtaining a preset number of pieces of feature information each time by performing a random extraction with replacement on the multi-dimensional feature information contained in each of the samples to construct a corresponding sub-sample, wherein each of the plurality of training sets is constructed with a plurality of sub-samples, and the plurality of training sets is constructed after performing the random extraction with replacement a number of times.

5. The method of claim 4, wherein the multi-dimensional feature information associated with the application comprises Q pieces of feature information, and the preset number is q, wherein the method further comprises:
   determining, with an equation $$M = \frac{C_Q^q}{2},$$

the number of the plurality of training sets constructed, wherein M represents the number of the plurality of training sets.

6. The method of claim 4, further comprising:
   after collecting the multi-dimensional feature information associated with the application as the samples:
   marking each of the samples in the sample set with a sample tag to obtain a plurality of sample tags, wherein the plurality of sample tags comprises sample tags indicative of that the application is able to be cleaned up and sample tags indicative of that the application is unable to be cleaned up;
   wherein the method further comprises:
   after constructing a corresponding sub-sample:
   marking each sub-sample with a sample tag of a corresponding sample.

7. The method of claim 1, wherein determining whether the application is able to be cleaned up according to the plurality of predicted results comprises:
   determining a ratio of the number of the predicted results indicative of that the application is able to be cleaned up to the number of all the plurality of predicted results as a cleanable probability;
   determining a ratio of the predicted results indicative of that the application is unable to be cleaned up to the number of all the plurality of predicted results as a maintaining probability;
   determining that the application is able to be cleaned up upon determining that the cleanable probability of the application is larger than the maintaining probability of the application; and
   determining that the application is kept to be in the background upon determining that the maintaining probability of the application is larger than the cleanable probability of the application.

8. The method of claim 7, further comprising:
   when a plurality of applications is in the background:
   selecting a preset number of applications from the plurality of applications in descending order of cleanable probabilities of the plurality of applications, or selecting, from the plurality of applications, applications each with a cleanable probability larger than a preset probability; and cleaning up the applications selected.

9. The method of claim 1, wherein collecting the multi-dimensional feature information associated with the application as the samples and constructing the sample set associated with the application according to the samples comprises:

collecting the multi-dimensional feature information associated with the application once every preset time interval, wherein the multi-dimensional feature information associated with the application comprises at least one of feature information associated with running of the application or status feature information of the electronic device;

determining the multi-dimensional feature information associated with the application collected each time as one of the plurality of samples; and obtaining the plurality of samples within a preset historical time period to construct the sample set.

10. An electronic device comprising:

at least one processor; and a computer readable memory coupled to the at least one processor and storing at least one computer executable instruction thereon which, when executed by the at least one processor, is operable with the at least one processor to:

collect multi-dimensional feature information associated with an application in the electronic device as samples and construct a sample set associated with the application according to the samples;

extract, according to a predetermined rule, feature information from the sample set to construct a plurality of training sets;

train each of the plurality of training sets to generate a corresponding decision tree;

predict, with a plurality of decision trees generated, current feature information associated with the application and output a plurality of predicted results upon detecting that the application is switched to the background, wherein the plurality of predicted results comprises predicted results indicative of that the application is able to be cleaned up and predicted results indicative of that the application is unable to be cleaned up;

determine whether the application is able to be cleaned up according to the plurality of predicted results; and clean up the application upon determining that the application is able to be cleaned up.

11. The electronic device of claim 10, wherein the at least one computer executable instruction operable with the at least one processor to train each of the plurality of training sets to generate a corresponding decision tree is operable with the at least one processor to:

compute an information gain of each piece of feature information contained in each of the plurality of training sets; and generate the corresponding decision tree by determining a piece of feature information with a maximum information gain in each of the plurality of training sets as a piece of feature information of a root node and determining remaining pieces of feature information in each of the plurality of training sets as pieces of feature information of leaf nodes in descending order of information gains of the remaining pieces of feature information.

12. The electronic device of claim 11, wherein the at least one computer executable instruction operable with the at least one processor to compute the information gain of each piece of feature information contained in each of the plurality of training sets is operable with the at least one processor to:

compute, with an equation $g(S, K)=H(S)-H(S|K)$, the information gain of each piece of feature information contained in each of the plurality of training sets, wherein $g(S, K)$ represents an information gain of feature information K contained in a training set S, $H(S)$ represents entropy of the training set S, and $H(S|K)$ represents entropy of the training set S after dividing the training set S with the feature information K, wherein $H(S)=\Sigma_{i=1}^{n}P_i \cdot \log P_i$, $P_i$ represents a probability that a predicted result of $i^{th}$ category appears in the training set S, and n represents predicted result categories, and wherein $H(S|K)=\Sigma_{i=1}^{n}P_i \cdot H(Y|K=K_i)$, $H(Y|K=K_i)$ represents conditional entropy of the training set S when the feature information K is fixed to be $K_i$.

13. The electronic device of claim 10, wherein the at least one computer executable instruction operable with the at least one processor to extract, according to the predetermined rule, the feature information from the sample set to construct the plurality of training sets is operable with the at least one processor to obtain a preset number of pieces of feature information each time by performing a random extraction with replacement on the multi-dimensional feature information contained in each of the samples to construct a corresponding sub-sample, wherein each of the plurality of training sets is constructed with a plurality of sub-samples, and the plurality of training sets is constructed after performing the random extraction with replacement a number of times;

the multi-dimensional feature information associated with the application comprises Q pieces of feature information, and the preset number is q, wherein the at least one computer executable instruction is further operable with the at least one processor to:

determine, with an equation $$M = \frac{C_Q^q}{2},$$

the number of the plurality of training sets constructed, wherein M represents the number of the plurality of training sets.

14. The electronic device of claim 13, wherein the at least one computer executable instruction is further operable with the at least one processor to:

mark each of the samples in the sample set with a sample tag to obtain a plurality of sample tags, wherein the plurality of sample tags comprises sample tags indicative of that the application is able to be cleaned up and sample tags indicative of that the application is unable to be cleaned up; and mark each sub-sample with a sample tag of a corresponding sample.

15. The electronic device of claim 10, wherein the at least one computer executable instruction operable with the at least one processor to determine whether the application is able to be cleaned up according to the plurality of predicted results is operable with the at least one processor to:

determine a ratio of the number of the predicted results indicative of that the application is able to be cleaned up to the number of all the plurality of predicted results as a cleanable probability, and determine a ratio of the predicted results indicative of that the application is unable to be cleaned up to the number of all the plurality of predicted results as a maintaining probability; and determine that the application is able to be cleaned up upon determining that the cleanable probability of the application is larger than the maintaining probability of the application, and determine that the application is kept to be in the background upon determining that the maintaining probability of the application is larger than the cleanable probability of the application.

16. The electronic device of claim 10, wherein the at least one computer executable instruction operable with the at least one processor to collect the multi-dimensional feature information associated with the application as the samples and construct the sample set associated with the application according to the samples is operable with the at least one processor to:

collect the multi-dimensional feature information associated with the application once every preset time interval, wherein the multi-dimensional feature information associated with the application comprises at least one of feature information associated with running of the application or status feature information of the electronic device;

determine the multi-dimensional feature information associated with the application collected each time as one of the plurality of samples; and obtain the plurality of samples within a preset historical time period to construct the sample set.

17. A non-transitory computer readable storage medium configured to store computer programs which, when executed by a processor of an electronic device, cause the processor to carry out actions, comprising:

collecting multi-dimensional feature information associated with an application in the electronic device as samples and constructing a sample set associated with the application according to the samples;

predicting, with a plurality of decision trees related to the sample set, current feature information associated with the application and outputting a plurality of predicted results upon detecting that the application is switched to the background, wherein the plurality of predicted results comprises predicted results indicative of that the application is able to be cleaned up and predicted results indicative of that the application is unable to be cleaned up;

determining whether the application is able to be cleaned up according to the plurality of predicted results; and cleaning up the application upon determining that the application is able to be cleaned up.

18. The non-transitory computer readable storage medium of claim 17, wherein the computer programs, when executed by the processor, are further configured to carry out actions, comprising:

extracting, according to a predetermined rule, feature information from the sample set to construct a plurality of training sets; and training each of the plurality of training sets to generate a corresponding decision tree, whereby the plurality of decision trees related to the sample set are generated.

19. The non-transitory computer readable storage medium of claim 17, wherein the computer programs, when executed by the processor, are further configured to carry out actions, comprising:

transmitting the sample set associated with the application to a server in communication with the electronic device; and receiving the plurality of decision trees from the server, wherein the plurality of decision trees is generated by the server according to the sample set.

20. The non-transitory computer readable storage medium of claim 17, wherein the computer programs executed by the processor to carry the action of determining whether the application is able to be cleaned up according to the plurality of predicted results are executed by the processor to carry out actions, comprising:

determining a ratio of the number of the predicted results indicative of that the application is able to be cleaned up to the number of all the plurality of predicted results as a cleanable probability;

determining a ratio of the predicted results indicative of that the application is unable to be cleaned up to the number of all the plurality of predicted results as a maintaining probability;

determining that the application is able to be cleaned up upon determining that the cleanable probability of the application is larger than the maintaining probability of the application; and determining that the application is kept to be in the background upon determining that the maintaining probability of the application is larger than the cleanable probability of the application.

* * * * *